No. 767,405. PATENTED AUG. 16, 1904.
A. D. HARRINGTON.
CORN PLANTING ATTACHMENT FOR CULTIVATORS.
APPLICATION FILED FEB. 29, 1904.
NO MODEL.
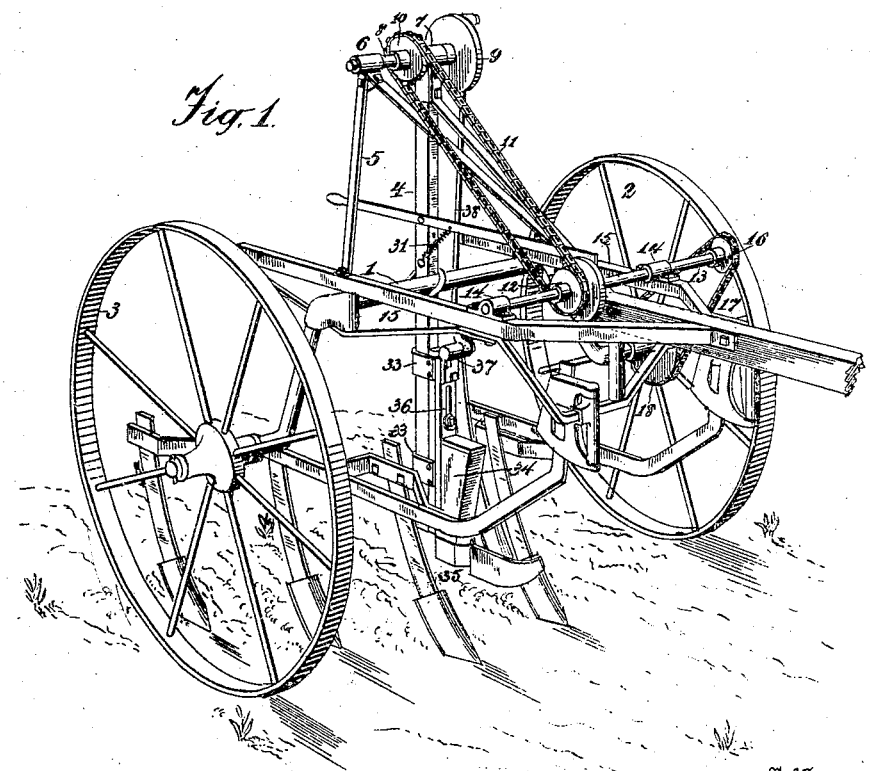
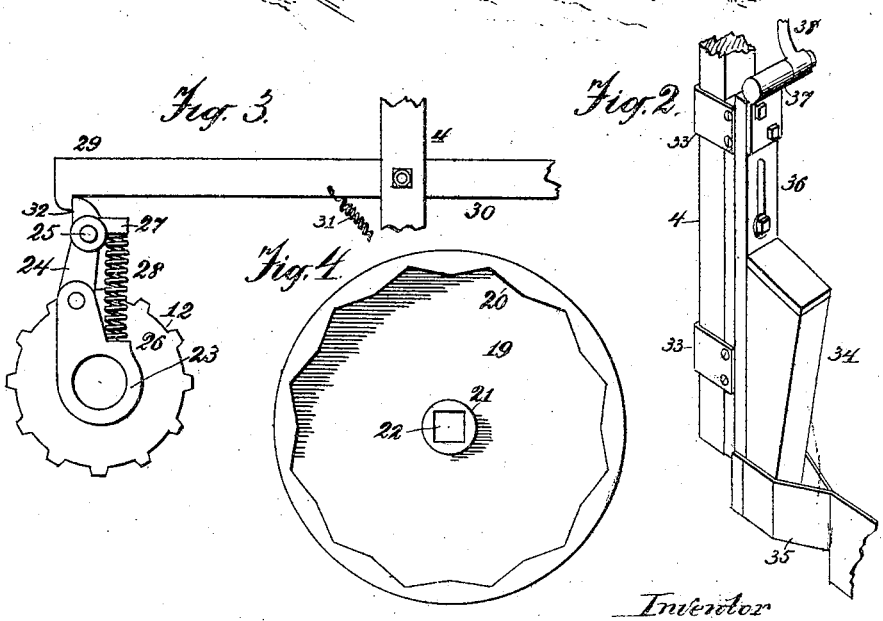
Witnesses
F. J. Kubíček
Judson A. Kramer
Inventor
Andrew D. Harrington,
By Justin M. St. John,
Atty.

No. 767,405.                                    Patented August 16, 1904.

UNITED STATES PATENT OFFICE.

ANDREW D. HARRINGTON, OF NORWAY, IOWA.

CORN-PLANTING ATTACHMENT FOR CULTIVATORS.

SPECIFICATION forming part of Letters Patent No. 767,405, dated August 16, 1904.

Application filed February 29, 1904. Serial No. 195,940. (No model.)

*To all whom it may concern:*

Be it known that I, ANDREW D. HARRINGTON, a citizen of the United States, residing at Norway, in the county of Benton and State of Iowa, have invented certain new and useful Improvements in Corn-Planting Attachments for Cultivators, of which the following is a specification.

The object of this invention is to provide a corn-cultivator with mechanism by means of which vacant corn-hills may be replanted during the first cultivation of the corn with little effort and no waste of time.

The nature of the invention will clearly appear from the description and claims following, reference being had to the accompanying drawings, in which—

Figure 1 is a view in perspective of apparatus embodying my invention as applied to a corn-cultivator. Fig. 2 is an enlarged view of a simple type of planter. Fig. 3 shows a part of the clutch and connected gearing for actuating the planter. Fig. 4 is a view of the other part of the clutch.

In the drawings, 1 designates the axle of a corn-cultivator of a well-known type provided with wheels 2 and 3. To the middle of this axle is clipped a vertical standard 4, extending down some distance below the axle. Another standard 5 is also provided, and the upper ends of said standards form bearings 6 and 7 for a short shaft 8, carrying a crank-wheel 9 at one end. This shaft is driven by a sprocket 10, secured to the shaft, a link belt 11, and a sprocket 12, having a clutch connection with a shaft 13, journaled in bearing 14, secured to the frame 15. At one end of this shaft is secured a sprocket 16, connecting by a link belt 17 with a large sprocket 18, secured to the main wheel 2. While the cultivator is moving a continuous motion is thus imparted to the shaft 13, which for convenience in connecting with the clutch is square except at the bearings.

A simple clutch is shown in Figs. 3 and 4. On the shaft is mounted a disk 19, internally fluted at 20 and having a hub 21 with a square hole 22 therein to take the shaft. On this hub is mounted revolubly a knuckle 23, to which is connected the sprocket 12 above mentioned. To the knuckle-arm is jointed an arm 24, provided with a roller 25 to engage the flutes of the disk on the straightening of the toggle-lever formed by the jointing of said arms. Between a shoulder 26 of the knuckle and a lug 27 on the outer arm is mounted a compression-spring 28, tending to straighten the toggle. The spring is compressed to release the clutch by a hook 29, pivoted at some suitable point, as to the standard 4, with a rearwardly-extending lever 30 within easy reach of the operator. A spring 31 brings the hook to engaging position with respect to a finger 32 at the upper end of the arm 24.

To the portion of the standard 4 extending below the axle is attached, as by guide-clips 33, a vertically-reciprocating planter 34 of a well-known type, but provided at the lower end with a shoe 35, similar to those in general use in connection with power-planters, the object of which is to make a short furrow as the planter descends and protect the seed-outlet, so that the dropping may be quick and uniform. The seed is dropped through the medium of a slide 36 in a familiar way. To the upper end of this slide is attached a wrist 37, and this is coupled by a connecting-rod 38 with the crank-wheel 9.

The operation of the device is as follows: When the planting mechanism is almost exactly over a vacant hill, (a brief time being allowed for the mechanism to act,) the operator quickly depresses the lever 30 and releases it, whereby the clutch causes the crank-wheel to make a single revolution. In the course of this action the whole planter descends by its own gravity until it strikes the ground, when the seed-slide is pushed down still farther by the crank and the seed is dropped, the whole being restored to normal position on the upstroke of the crank.

Having thus described my invention, what I claim as new, and desire to secure by Letters Patent, is—

1. The combination with a corn-cultivator, of a reciprocating planter attachment, a vertical guide therefor, gearing connecting the planter mediately with one of the cultivator drive-wheels, a clutch to intermittently engage and disengage said gearing, and a trip-lever for said clutch.

2. The combination with a corn-cultivator, of a corn-planter attachment, a vertical standard forming a guide therefor, a crank-wheel mounted on said standard, a connection of the crank with the planter, gearing adapted to rotate said crank-wheel, a clutch to intermittently engage and disengage the gearing, and a trip-lever to control the action of the clutch.

In testimony whereof I affix my signature in presence of two witnesses.

ANDREW D. HARRINGTON.

Witnesses:
J. M. St. John,
B. L. Wick.